Dec. 6, 1960  H. DU VAL, JR., ET AL  2,963,626
CONTROL SYSTEMS AND APPARATUS
Filed Sept. 10, 1957  4 Sheets-Sheet 1
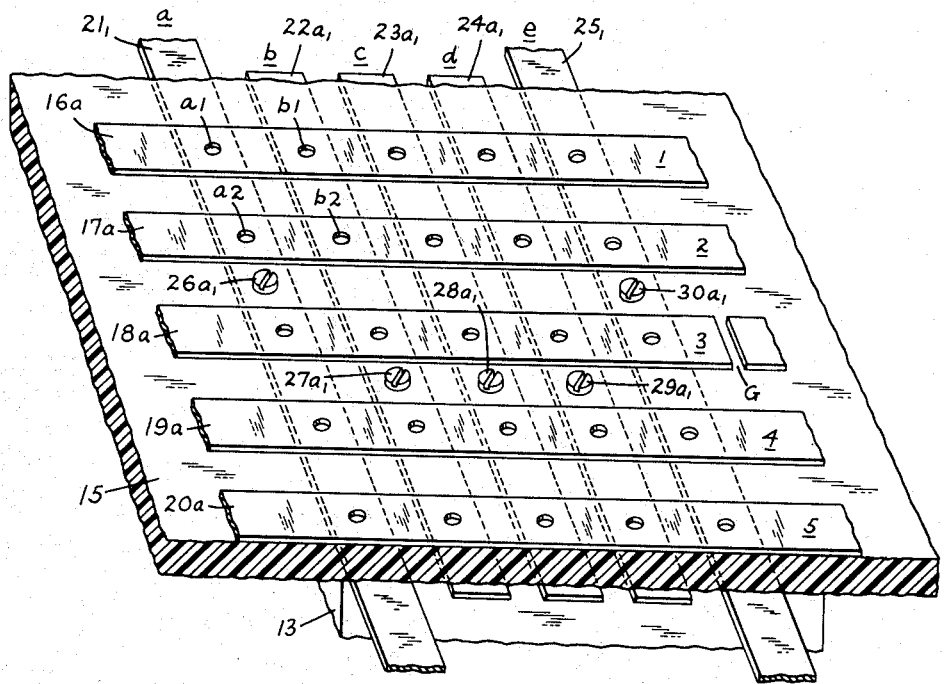
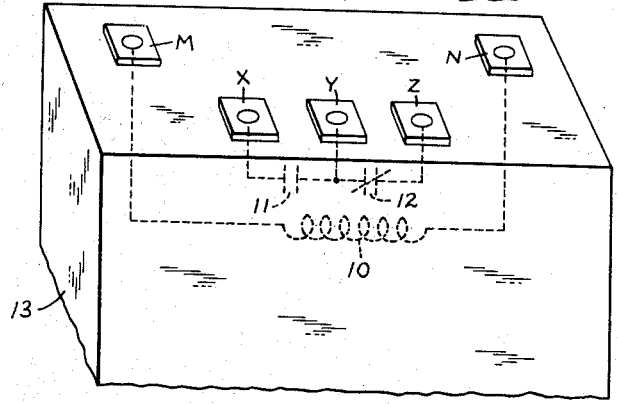
INVENTORS
HERBERT DuVAL, JR.
RALPH R. BATCHER
BY
Brumbaugh, Free, Graves & Donohue
THEIR ATTORNEYS Dec. 6, 1960     H. DU VAL, JR., ET AL     2,963,626
CONTROL SYSTEMS AND APPARATUS
Filed Sept. 10, 1957     4 Sheets-Sheet 4

INVENTORS
HERBERT DuVAL, JR.
RALPH R. BATCHER
BY
*Brambaugh, Nee, Graves & Donohue*
THEIR ATTORNEYS

United States Patent Office 2,963,626
Patented Dec. 6, 1960

2,963,626

CONTROL SYSTEMS AND APPARATUS

Herbert Du Val, Jr., R.F.D. 3, Camel Hollow Road, Huntington, N.Y., and Ralph R. Batcher, 242—02 42nd Ave., Douglaston, N.Y.

Filed Sept. 10, 1957, Ser. No. 683,165

11 Claims. (Cl. 317—99)

The present invention, generally, relates to electrical control systems and, more particularly, to new and improved electrical equipment which greatly simplifies the design and construction of any electrical control system to the end that very substantial savings in time and expense may be effected.

In the current trend toward automation, the problem of automatic controls for industrial operations is becoming increasingly important. However, each control system design problem encountered by the technician or engineer is usually unique to that particular operation and, hence, each system must be engineered, manufactured and sold individually whereby the advantages of mass production do not obtain.

Accordingly, it is a principal object of this invention to provide new and improved means enabling substantial reductions to be effected in the time and cost involved in the design and construction of an electrical control system.

It is also an important object of the invention to provide electrical equipment capable of solving the most complex control problem with a minimum of human effort.

A further object of the invention is to provide new and improved means for facilitating the design of an electrical control system for any selected operation.

A still further object of the invention is to provide the advantages of mass production in the construction of one-of-a-kind electrical systems of control.

Another object of the invention is to reduce substantially, or eliminate, the need for wiring diagrams, layout drawings, manufacturing drawings and the like in constructing complicated electrical control systems whereby such systems may be manufactured speedily and economically.

The present invention supplements the teachings in the applicants' copending United States patent application, Serial No. 611,527, for "Control Systems and Apparatus," filed September 24, 1956. That application discloses techniques and equipment utilizing basic modules in the design and construction of electrical control systems. Each module comprises a conductive path including a pair of normally closed contacts, a conductive path including a pair of normally open contacts, and one or more fixed or feed-through conductive paths. A control system may be formed by disposing a plurality of such modules in adjacent spaced columns and rows, the contacts of each module in the respective columns being connected for simultaneous operation by actuator means such as one or more electromagnets and the ends of the conductive paths in each module lying adjacent the beginnings of the corresponding conductive paths in the next module in a row. By using simple conductor means to make connections between the ends and beginnings of selected conductive paths in the modules in a row, those conductive paths may be connected in an electrical circuit capable of performing a desired function, and other like circuits may be formed in a similar manner.

According to the present invention, a modification in the interconnections of the module elements brings about a simplification of the constructional and mounting details of the modules. The same switching elements of a module are utilized as in the aforesaid application Serial No. 611,527, having the same functions, i.e. to break a normally closed circuit path and to close a normally open circuit path upon the operation of an actuating mechanism that is common to all modules in a given tier.

The contacting elements of the switching elements within each module are permanently connected to a set of three conductive strips within the confines of the module, located in substantially parallel alignment with the modules in the tier. In addition, a set of two conductive strips are mounted within or near the modules of a tier and extend the full length of the tier. This last set of conductors serves to connect the operating coil or coils of modules in a tier to the module connection wiring network at required points. Another array of substantially parallel groups of conductors is mounted in parallel relationship and angularly disposed so as to pass across the modules in the tiers and lie along the faces of the modules in each row. These groups of conductors, typically but not necessarily five in number, are normally insulated from the other two sets of conductors and form crossed grids therewith.

The crossed grid relationship may be accomplished by mounting the module sets of conductors within the modules or on the faces thereof, the tier sets of conductors in a parallel relationship on the faces or sides of the modules, and the array of parallel groups of conductors by raised projections on the faces of the modules so that they are held in a parallel plane with the planes of the module and tier sets of conductors. Alternatively, the module and tier sets of conductors may be mounted on one side of an insulating mounting panel, the array of parallel groups of conductors being mounted on the other face of the panel. The conductors attached to the panel may be metallic ribbons or they may be fabricated by the well-known printed wiring techniques.

When panel mounting is used, each module is provided with contacts adapted to be maintained in electrical engagement with conductors in the module and tier sets when it is mounted on the panel. Also, each conductor in a module or tier set may be connected electrically to any conductor in the array of parallel groups of conductors by simple conductor means extending through the panel and in electrical engagement with conductors on the opposite side of the panel. The positions of the crossover points where the last-named groups of conductors pass over the conductors of the module and tier sets may be marked with reference indications, or holes may be prepared through the panel to facilitate the placement of such conductor means.

The invention also contamplates the provision of certain electrical accessories such as push buttons, meters, and the like, or even larger items such as synchronous motor field control units, for example, having electrical connector means similar to that described above for the modules. Such accessories may be mounted at convenient locations on the panel board and their terminals connected electrically to selected first group conductors in the manner described above. Alternatively, such accessories may be mounted in modular-like blocks having the dimensions of a module, and be assembled along with the modules, in one or more of the tiers. By connecting modules and accessories with selected conductors, control circuits for performing specified operations in any desired time relation may be established quickly and with a minimum of time and effort.

It is to be understood that the above-described arrangements are simply illustrative of the application of the principles of the invention. Numerous other arrangements may be devised readily by those skilled in the art which will employ the principles of invention and fall within the spirit and scope of the appended claims.

The drawings accompanying and forming part of the specification illustrate several practical commercial embodiments of the invention. It should be understood, however, that the invention is not limited to these particular structures, as will appear from the scope of the appended claims.

In the drawings:

Fig. 1 is a sectional view in perspective of a portion of a panel having crossed grid conductors illustrating one way of connecting a module thereto according to the invention;

Fig. 2 is a schematic diagram, in perspective, of a typical module constructed according to the invention;

Figure 3:
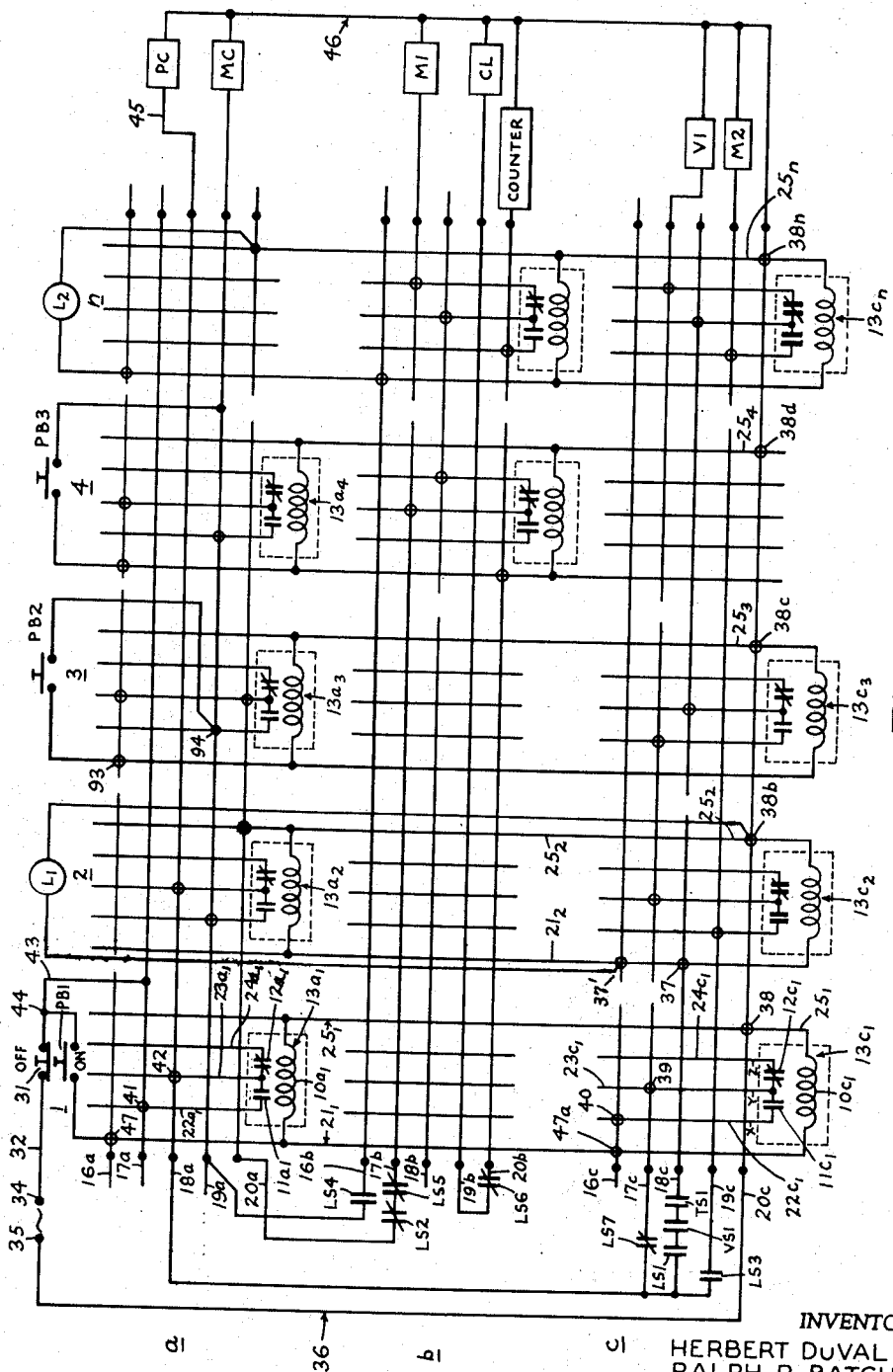
Fig. 3 is a schematic diagram illustrating how several modules might be connected to conductors on a panel as in Fig. 1 to form control circuits in a control system according to the invention.

For simplicity, all of the electrical switching modules used in the system described below are the same, although in some cases this may not be needed or desirable as will become apparent. It will be necessary, therefore, to describe only one switching module in detail, corresponding parts in the others being designated by corresponding reference characters combined with the designation for the location of the particular module on the supporting panel in each case. Thus, the module 13 in Fig. 2 includes an actuating coil 10, normally open contacts 11 and normally closed contacts 12, respectively. The structure of the module 13 is such that when the contact 12 is opened, the contact 11 is closed, as shown, for example, in the patent application referred to above.

Each of the circuit elements in the module 13 is connected to terminals on the surface of each module. As shown in Fig. 2, the normally open contracts 11 are electrically connected to the terminals X and Y and the normally closed contacts 12 are electrically connected to the terminals Y and Z. The actuating coil 10 is electrically connected between the terminals M and N. These terminals are so located on each module that they may be readily connected to conductors on a panel 15, as described below.

The panel 15 (Figs. 1 and 3) is made of any suitable electrically insulating material and it has on the opposite sides thereof row 1, 2, 3 . . . $n$ and columns $a, b, c, n$ (both beginning at the upper left-hand corner) of crossed grids formed by groups of electrically conductive strips. For simplicity, only the crossed grid in row 1 column $a$ is shown in Fig. 1. It comprises a plurality of vertically spaced, horizontal conductors $16a$, $17a$, $18a$, $19a$ and $20a$ on the front surface of the panel 15 and a plurality of laterally spaced apart vertical conductors $21_1$, $22a_1$, $23a_1$, $24a_1$ and $25_1$ on the rear surface of the panel 15. The numbers of rows and columns of crossed grids will, of course, depend on the number of modules to be accommodated.

All of the horizontal conductors on the front of the panel 15 extend across all of the columns of vertical conductors. Also, the two endmost vertical conductors (e.g., the conductors $21_1$ and $25_1$ in row 1, column $a$) extend across all of the horizontal conductors. However, the remaining vertical conductors in each crossed grid (e.g., the conductors $22a_1$, $23a_1$, and $24a_1$) extend only over the horizontal conductors associated with that grid as shown in Figs. 1 and 3.

The continuous conductor strips on the panel may be formed by any suitable means as, for example, mounting separate strips of metal on an insulating panel, or by forming conductive strips by the printed circuit method. That is, it is possible to mold the conductors into the panel.

In order to form an electrical control system according to the invention, electrical modules like the module 13 are adapted to be secured at selected positions on the back of the panel 15 where crossed grids are formed by adjacent groups of horizontal and vertical conductors.

Thus, a module 13 may be mounted on the rear face of the panel 15 with the contacts M, X, Y, Z and N thereon in electrical engagement with the vertical conductors $21_1$, $22a_1$, $23a_1$, $24a_1$ and $25_1$, respectively, as shown in Fig. 1. The module 13 may be secured to the panel 15 in any suitable manner as by the screws $26a_1$, $27a_1$, $28a_1$, $29a_1$, and $30a_1$, for example. Preferably, these screws should be inserted in the spaces between the horizontal conductors, as shown.

Control circuits may be formed, as desired, by making electrical connections between selected horizontal conductors and the vertical conductors therebehind. Such interconnections may be effected in any desired manner as by inserting metallic screws, plugs or other links into holes through the panel 15 and the conductors to be connected together. These holes can be formed wherever the through-the-panel links are needed or, alternatively, a complete set of holes at all of the connectable positions can be formed in advance.

In some control systems that may be constructed with modules of the type described, isolating breaks G (Fig. 1) may be needed at one or more points along certain of the horizontal strips on the front surface of the panel. Such gaps or breaks, which occur between the modules, may be formed in any suitable way as, for example, by etching, gouging, sawing, etc. These gaps are preferably formed as needed for the specific circuit under consideration since relatively few gaps will be required, under normal conditions, in the usual system of connections.

On the other hand, if it develops that many gaps will be required in a particular control system, then breaks can be provided in the horizontal conductor strips between each group of vertical conductor strips. Where circuit continuity is desired, such breaks can be bridged over by metallic links (not shown). In any case, the positions where either the gaps are required or the gaps are to be bridged can be referred to by coded symbols so that these operations can be handled automatically in the manufacture of the panel.

Fig. 3 illustrates how a typical control system might be constructed according to the invention. For comparative purposes, the system here shown is the full equivalent of that depicted in Fig. 6 of the aforementioned copending application Serial No. 611,527 which is an automatic control system intended for use in the slush molding of plastisols. It will not be necessary to describe the entire system shown in Fig. 3 since a description of several representative circuits in the system will serve amply to illustrate the invention.

A typical branch circuit in the system of Fig. 3 is the one which puts the powered elements of the system in normal operating condition. This circuit is formed in Fig. 3 by connecting a normally-closed Off switch 31 and a normally-open On switch in series PB1, the switch 31 being connected by the conductor 32 to one mains terminal 34, the switch PB1 being connected to the conductor $16a$ on the front face of the panel 15. The other mains terminal 35 is connected by a conductor 36 to the conductor $20C$ on the front face of the panel. The conductor $20C$ is electrically connected to the continuous vertical conductor $25_1$ by conducting means 38 such as a pin or a screw extending through the panel 15, and through similar means $38b$, $38c$, $38d$ . . . $38n$ to the vertical conductors $25_2$—$25n$, respectively, of the other tiers.

Mounted on the rear face of the panel board 15 with their contacts engaging the appropriate vertical conductors of each crossed grid of conductors are a plurality of modules 13 of the type shown in Fig. 2. Thus, one module $13a_1$ has its contacts M, X, Y, Z and N in electrical engagement with the vertical conductors $21_1$, $22a_1 \ldots 25_1$, respectively. Similarly, the module $13C_1$ has its contacts M, X, Y, Z and N in electrical engagement with the conductors $21_1$, $22C_1$, $23C_1$, $24C_1$ and $25_1$, respectively. Also, plug-in or screw type connectors 39, 40, 41, 42, 47a and 47 are inserted in the panel 15 as follows: the connector 39 between the vertical conductor $23C_1$ and the horizontal conductor 17C; the connector 40 between the vertical conductor $22C_1$ and the horizontal conductor 16C; the connector 41 between the vertical conductor $22a_1$ and the horizontal conductor 17a; the connector 42 between the horizontal conductor 18a and the vertical conductor $23a_1$; and the connector 47 between the vertical conductor $21_1$ and the horizontal conductor 16a; and the connector 47a between the vertical conductor $21_1$, and the horizontal conductor 16C.

In addition to the foregoing connections, the horizontal conductor 17a is connected by a conductor 43 to the midpoint 44 between the Off button 31 and the On button PB1. The normally closed contacts of a limit switch LS7, the purpose of which is explained in the aforementioned copending application Serial No. 611,527, are connected between the horizontal conductor 18a and the horizontal conductor 17C. Also, a master relay PC is connected by a conductor 45 to the horizontal conductor 18a and by a conductor 46 to the horizontal conductor 20C.

Considering only the portion of the circuit described above, it will be understood that when the normally open On pushbutton PB1 is depressed, a circuit is completed which is traced from the mains terminal 34 through the conductor 32, the normally closed Off pushbutton 31, the closed On pushbutton PB1, the horizontal conductor 16a, the connector 47, the conductor $21_1$, the relay windings $10a_1$, and $10C_1$, the conductor $25_1$, the vertical conductor 25, the connector 38, the horizontal conductor 20C and the conductor 36 to the other mains terminal 35. This energizes the relay winding $10a_1$ opening its normally closed contacts $12a_1$ and closing its normally open contacts $11a_1$.

The relay winding $10C_1$, which is also connected to the vertical conductors $21_1$ and $25_1$, is likewise energized at this time, opening its normally closed contacts $12C_1$ and closing its normally open contacts $11C_1$.

The closing of the contacts $11C_1$ completes a circuit through the connectors 39 and 40 which are in parallel with the contacts of the switch PB1 but through the limit switch LS7. This keeps the modules in this tier operated after the switch PB1 is released, until the limit switch LS7, which is connected to the horizontal leads 17C and 18a operates. The function of the limit switch LS7 is described in the aforementioned copending application. This same circuit energizes the master control relay PC through the horizontal lead 18a and the conductor 45, which puts the powered elements utilized in the process (not shown) in the normal operating condition.

As soon as the limit switches LS1, VS1 and TS1 all operate, which occurs after certain starting conditions in the process have been met, power from the line 34, which now appears on the horizontal lead 18a is connected by these switches to the horizontal lead 18C, and thence by means of the conductor link 37, and the vertical conductor $21_2$ to the operating coils of the relays in the modules of tier 2, the circuit being completed through the conductor $25_2$, the conductor link 38b, the horizontal conductor 20C, and the conductor 36 to the other power terminal 35.

Figure 6:
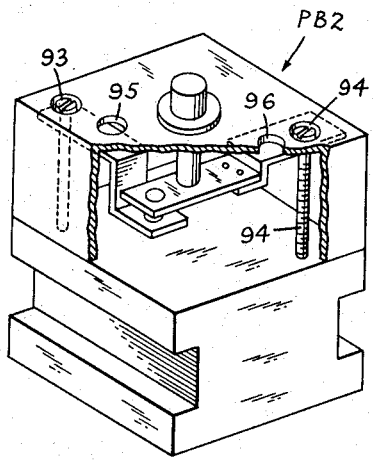

In similar fashion, other circuits are formed in Fig. 3 which function to carry out the succeeding steps in the process described in the aforementioned copending application with reference to Fig. 6 therein.

Further advantages may be achieved according to the invention by mounting on the panel in a manner similar to the modules 13 electrical accessories needed in the control system, such as, for example, pushbuttons, indicator lights, rheostats, capacitors, transformers, rectifiers, and the like. For example, an indicator light might be mounted on an insulating board with its terminal connected to horizontal or vertical conductor strips or one terminal connected to a horizontal conductor strip and the other terminal connected to a vertical conductor strip. By making the conductor strips of sufficient length, the terminals may be connected to appropriate horizontal or vertical conductors comprising a crossed grid on the panel 15 by plug or screw type connectors extending through the panel.

Also, it is possible to mount on panels, similar to that described above, certain subassemblies which are likely to be used in a number of different control systems. Typical of such subassemblies are the field panel of a synchronous motor control and so-called speed control power units. Mounting boards carrying such subassemblies could be secured on the panel 15 and connections made therefrom to the several circuits by means of plug or screw type connectors in the manner described above.

Figure 4:
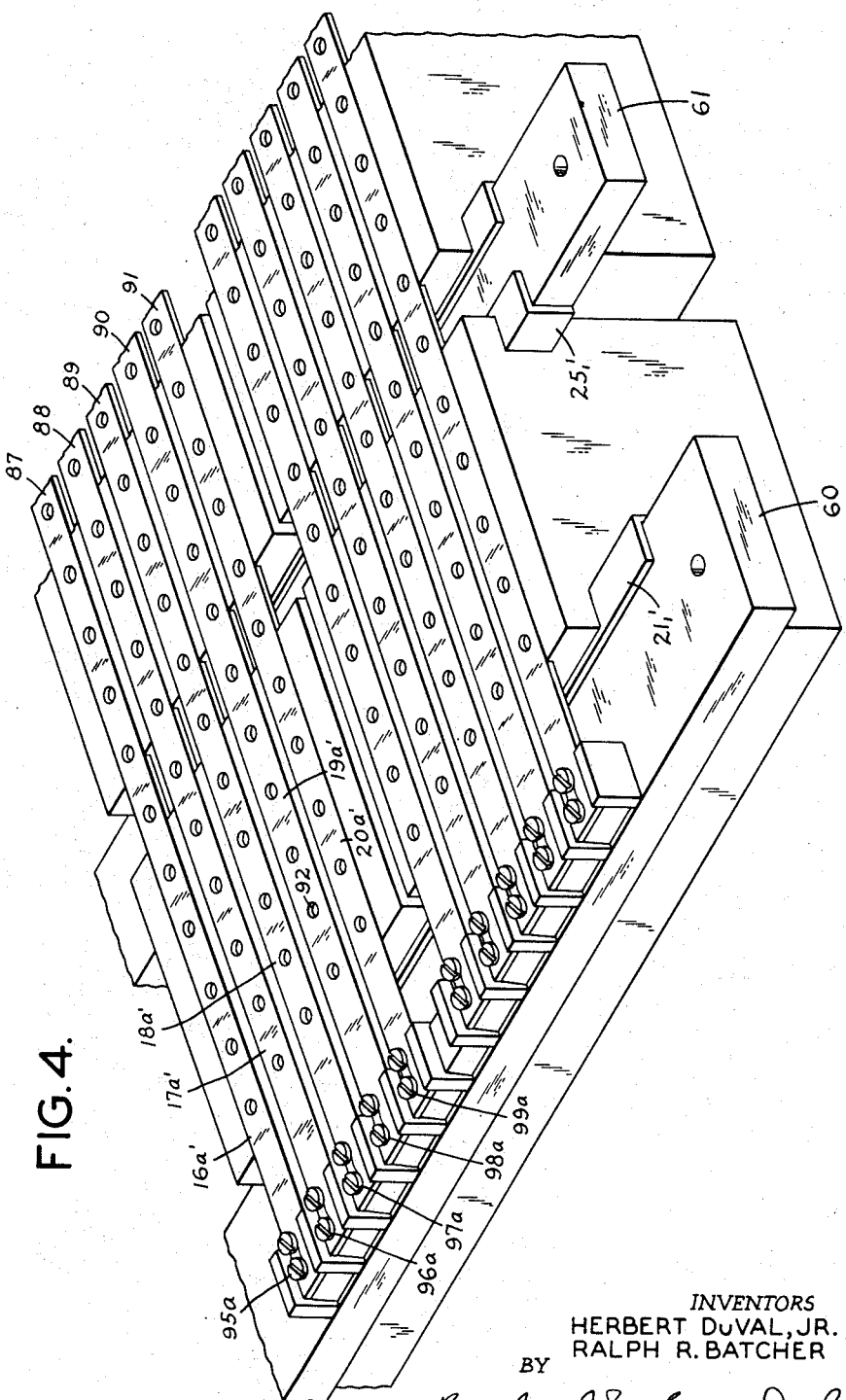
Fig. 4 is a view in perspective, partly in section, of a modified form of system embodying electrical modules according to the invention.

In the modification shown in Fig. 4, the modules are mounted between parallel bars or rails 60—61, etc., carrying metallic strips $21_1' \ldots 21_n'$ and $25_1' \ldots 25_n'$ corresponding to the conductors $21_1 \ldots 21_n$ and $25_1 \ldots 25_n$ in Fig. 3. These bars extend for the height of the tiers and for a sufficient distance beyond to permit their use in mounting the assembly within a cabinet or frame (not shown). The conductors $21_1' \ldots 21_n'$ and $25_1' \ldots 25_n'$ thus also extend for the full height of the tiers of modules.

Figure 5:
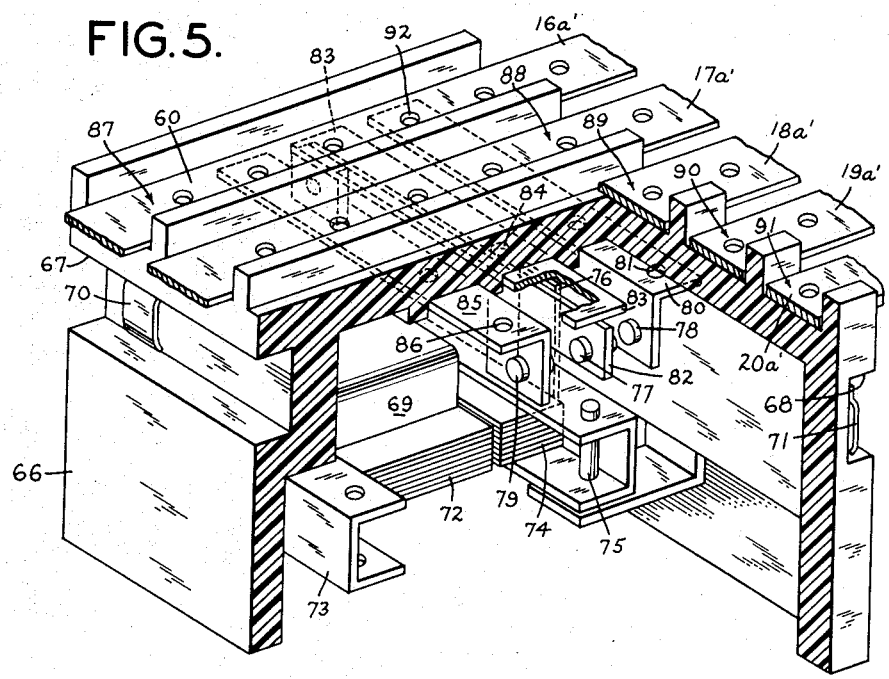
Figs. 5, 6 and 7 are views in perspective of different electrical modules that may be employed in the system of Fig. 4.

Fig. 5 shows a cutaway view in perspective of one of the modules constituting the assembly shown in Fig. 4. It comprises a box-like case 66 having grooves 67 and 68 in the opposite sides thereof in which the parallel bars 60 and 61, for example (Fig. 4), are adapted to be slidably received. Inside the case 66 is an electromagnet winding 69, the terminals of which are connected to brushes 70 and 71 mounted in the grooves 67 and 68, respectively. The brushes 70 and 71 are adapted to engage the conductive strips $21_1'$ and $25_1'$, respectively, in Fig. 4, for example.

The winding 69 is mounted on a core 72 held in a mounting clamp 73. The armature 74 of the electromagnet is pivoted at 75 and it carries an actuator 76 which is adapted to move a movable contact 77 out of engagement with a fixed contact 78 and into engagement with a fixed contact 79.

The fixed contact 78 is carried by a conductive strip 80 which is secured beneath the upper surface of the case 66 and has formed therein a plurality of spaced apart openings 81 into which screws or other connecting devices may be inserted, as required, to make connection to a circuit.

Similarly, the movable contact 77 is mounted on a spring arm 82 secured to a conductive strip 83 having a plurality of spaced holes 84 formed therein to facilitate interconnecting the movable contact 77 in the circuit.

Also, the fixed contact 79 is carried by a conductive strip 85 having a plurality of spaced holes 86 formed therein to receive connectors, as described above.

The upper face of the case 66 is provided with a plurality of guide channels 87, 88, 89, 90 and 91 having a plurality of holes 92 formed therein corresponding to the possible module connection positions. It will be noted that certain of these holes 92 register with the holes 81, 84 and 86 in the conductive strips 80, 83 and 85, respectively.

As best shown in Fig. 4, the channels 87—91, respectively, are adapted to receive the horizontal conductor strips 16a', 17a', 18a', 19a', 20a', etc. These horizontal strips, which may be thin metal ribbons provided with spaced apart holes 92, are laid in the channels across the array of modules with the hole grooves aligned with the holes in the module faces defining the possible connection positions. Connections between the various groups of conductive strips are made by using screws or other forms of connective links as described above in connection with Fig. 3.

Figure 7:
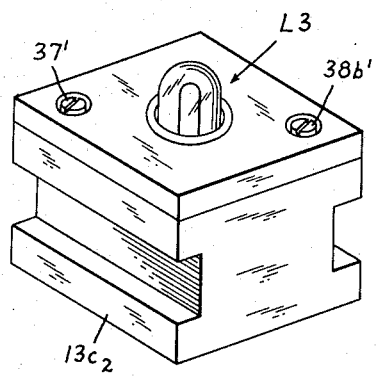

Accessories such as, fuses, meters, manual switches, lamps and the like, may also be included in an assembly of the type shown in Fig. 4. Typical switch assembly and panel lamp assembly modules are shown in Figs. 6 and 7. Such accessories may be mounted in covering cases which can be attached to the operating face of a switching module, the dimensions of the face in such cases being similar to those of the module. In this form, a switch, or other accessory item within such a covering case may be connected by screws or other connectors to the appropriate terminal positions at the location of the module. For example, the switch PB2 in Figs. 3 and 6 would be connected to the module $13a_3$ of the array by means of two screws entering the module at the points 93 and 94. Other possible connection locations are indicated by the holes 95 and 96 in Fig. 6.

Similarly, a panel lamp cover case corresponding to the lamp L1 in Figs. 3 and 7 would be connected to the module $13c_2$ by screws 37' and 38b, which screws accomplish the interconnections previously described, and also connect the lamp L1 into the circuit so that it will light whenever the modules in tier 2 are energized.

The first rail 69 of an array of the type shown in Fig. 4 may be somewhat wider than the others so as to provide a support for the terminal strips 95a, 96a, 97a, 98a, 99a, etc., for each of the horizontal conductors. Similar terminal strips (not shown) may be provided on the last rail of the array. All external cables from other parts of the system as well as the various types of limit switches and powered or controlled items in Fig. 3 can be connected to the module array by these terminal strips.

It will be understood that the parts of the system could be stocked without hardware and "wired" by using coded data to control automatic machinery for inserting the plug or screw type connectors at the desired locations. The hardware needed for mounting modules and the like can then be added where needed and this may also be done automatically from the same data used in making the proper connections on the panel.

For maximum flexibility, it may be desirable to provide one or more vertical conductors between the input terminals to the panel 15 and the first tier of modules mounted thereon. Similar vertical conductors might be provided between the last tier of modules and the output terminals of the panel 15. This would permit inputs to be paralleled and outputs to be combined as desired. Also, by providing one or more vertical feed-through conductors on the panel between each tier of modules, nodes could be established in the system thereby further increasing its flexibility.

An important practical advantage of the modular system of industrial control disclosed herein is that it makes available at each module position feed-through conductors that are not affected by the switch members in that module. It has been found that two such feed-through circuits in each module are usually sufficient. In this double grid system of cross-connections, it will be noted that at least two feed-through conductors are available. In fact, all conductors not actually needed for switching are available for feed-through service.

While the invention has been described with reference to the particular procedure and construction shown, it is not restricted to the exact details herein disclosed and this application is intended to cover such modifications or changes as may come within the purposes of the invention or the scope of the following claims.

We claim:

1. In electrical control means, the combination of an insulating panel; a first plurality of substantially parallel conductors arranged in spaced parallel first groups on one side of said panel; a plurality of similar electrical modules mounted on said panel, said modules being spaced apart along said first groups of conductors to form an array of rows and tiers of modules, each of said modules having at least three substantially parallel conductors spaced apart along, and insulated from the conductors of the first group corresponding thereto and crossing the same, a pair of normally closed contacts bridging two of said three conductors, a pair of normally open contacts bridging one of said two and the third of said conductors, and actuator means including winding means for operating said pairs of contacts simultaneously; and a second plurality of substantially parallel conductors each crossing all of said first groups and arranged in second groups of two associated with said respective tiers of modules and spaced apart along said first groups of conductors, the winding means of the modules of each tier being connected to the conductors of the second group corresponding thereto, and means enabling conductors of said first group to be connected selectively to the conductors of said modules at locations where they cross.

2. In electrical control mechanism, the combination of a plurality of substantially parallel guide members, an electrical module supported between adjacent ones of said guide members and having switching means and actuator means therefor, a first plurality of substantially parallel spaced conductors carried by said module and connected to said switching means, a second plurality of substantially parallel spaced conductors disposed above said module, said second plurality of conductors being greater in number than and crossing said first plurality of conductors, and means enabling conductors of said first and second pluralities to be connected together selectively at locations where they cross.

3. In electrical control mechanism, the combination of a plurality of substantially parallel guide members, a plurality of similar electrical modules supported between adjacent guide members in rows and tiers, each of said modules having switching means with actuator means therefor and a first plurality of substantially parallel conductors connected to said switching means, a plurality of parallel spaced groups of parallel conductors, each group overlying the modules in a row and crossing the conductors of each module, and the conductors in each group being greater in number than the conductors of each module, means common to each tier of modules for simultaneously operating the actuator means thereof, and means enabling conductors of said groups to be connected selectively to conductors of said modules at locations where they cross.

4. In electrical control mechanism, the combination of a plurality of substantially parallel guide members, a plurality of contact means associated with said guide members, an electrical module supported between adjacent ones of said guide members, and provided with contact members engaging the contact means associated with the supporting guide members therefor, said module also having switching means connected to a first plurality of substantially parallel spaced conductors and switch actuator means connected to said contact members, a second plurality of substantially parallel conductors disposed above said module and crossing said guide members and module conductors, and means enabling said guide member contact means and the conductors of said first and second pluralities to be connected together selectively at locations where they cross.

5. In electrical control mechanism, the combination of a plurality of substantially parallel guide members having electrical conductors associated therewith; a plurality of similar electrical modules supported between adjacent guide members in rows and tiers, each of said modules having switching means connected to three parallel spaced conductors disposed substantially parallel to said guide members, electromagnet means for operating said switching means and including winding means connected to contact means on the module engaging the electrical conductors associated with the adjacent supporting guide members; a plurality of groups of substantially parallel conductors extending over the modules constituting the respective rows of said array, respectively, the conductors of each of said groups crossing the three conductors of each module in the corresponding row; and means enabling conductors of said last-named groups to be connected with selected ones of the group of conductors including the three conductors of selected modules and said guide member conductors at locations where they cross.

6. Electrical control mechanism as in claim 4 together with an electrical accessory element mounted on said module, and means connecting said element to conductors of said first and second pluralities in the vicinity of said module.

7. An electrical control system comprising a plurality of groups of switching modules, the modules of each group being aligned in a direction substantially parallel to those of the other groups, contact means comprising a group of switch contacts in each module, actuating means energizable to operate the contact means of all the modules of each group simultaneously, connecting means within each switching module comprising a group of conductors corresponding to the group of contacts, a plurality of substantially parallel conductors extending in a direction to intersect the lines of all the groups of switching modules, insulating plate means separating the plurality of parallel conductors from the connecting means of each module, and means for electrically connecting selected conductors of the plurality of parallel conductors with selected conductors of the connecting means at the intersections thereof at each switching module.

8. An electrical control system comprising a plurality of groups of switching modules, the modules of each group being aligned in a direction substantially parallel to those of the other groups, contact means comprising a group of switch contacts in each module, actuating means energizable to operate the contact means of all the modules of each group simultaneously, connecting means within each switching module comprising a group of conductors corresponding to the group of contacts, conductor means extending substantially parallel to the direction of the switching modules in each group for energizing all the actuator means of the group, a plurality of substantially parallel conductors extending in a direction to intersect the lines of all the groups of switching modules, insulating plate means separating the plurality of parallel conductors from the connecting means of each module, and means for electrically connecting selected conductors of the plurality of parallel conductors with selected conductors of the connecting means at the intersections thereof at each switching module.

9. An electrical control system comprising a plurality of groups of switching modules, the modules of each group being aligned in a direction substantially parallel to those of the other groups, contact means comprising a group of switch contacts in each module, actuating means energizable to operate the contact means of all the modules of each group simultaneously, connecting means within each switching module comprising a group of conductors corresponding to the group of contacts extending substantially parallel to the direction of the group of modules, a plurality of substantially parallel conductors extending in a direction to intersect the lines of all the groups of switching modules, insulating plate means separating the plurality of parallel conductors from the connecting means of each module, and means for electrically connecting selected conductors of the plurality of parallel conductors with selected conductors of the connecting means at the intersections thereof at each switching module.

10. An electrical control system comprising a plurality of groups of switching modules, the modules of each group being aligned in a direction substantially parallel to those of the other groups, contact means comprising a group of switch contacts in each module, actuating means energizable to operate the contact means of all the modules of each group simultaneously, connecting means within each switching module comprising a group of conductors corresponding to the group of contacts, a plurality of substantially parallel conductors extending in a direction to intersect the lines of all the groups of switching modules, the plurality being arranged in a group of arrays each crossing over the connecting means of one module of each group, insulating plate means separating the plurality of parallel conductors from the connecting means of each module, and means for electrically connecting selected conductors of the plurality of parallel conductors with selected conductors of the connecting means at the intersections thereof at each switching module.

11. An electrical control system comprising a plurality of groups of switching modules, the modules of each group being aligned in a direction substantially parallel to those of the other groups, contact means comprising a group of switching contacts in each module, actuating means energizable to operate all the contacts of each module simultaneously, connecting means within each module comprising a group of conductors corresponding to the group of switching contacts each extending substantially parallel to the direction of the modules of the group, conductor means for energizing all the actuating means in each group of modules simultaneously extending substantially parallel to the direction of the modules in the group, a plurality of substantially parallel conductors extending in a direction to intersect the lines of all the groups of switching modules, insulating plate means separating the plurality of parallel conductors from the connecting means of each module, and means for electrically connecting selected conductors of the plurality of parallel conductors with selected conductors of the connecting means at the intersections thereof at each switching module.

References Cited in the file of this patent

UNITED STATES PATENTS

| | | |
|---|---|---|
| 1,810,732 | Sanner | June 16, 1931 |
| 2,151,433 | Twiggan | Mar. 21, 1939 |
| 2,467,727 | Brown | Apr. 19, 1949 |
| 2,480,568 | Garvin | Aug. 30, 1949 |
| 2,568,535 | Ballard | Sept. 18, 1951 |
| 2,613,287 | Geiger | Oct. 7, 1952 |

FOREIGN PATENTS

| | | |
|---|---|---|
| 74,178 | Sweden | Dec. 17, 1930 |

OTHER REFERENCES

Electronic Engineering, pages 12 and 13, December 1954.